United States Patent Office 2,990,170
Patented June 27, 1961

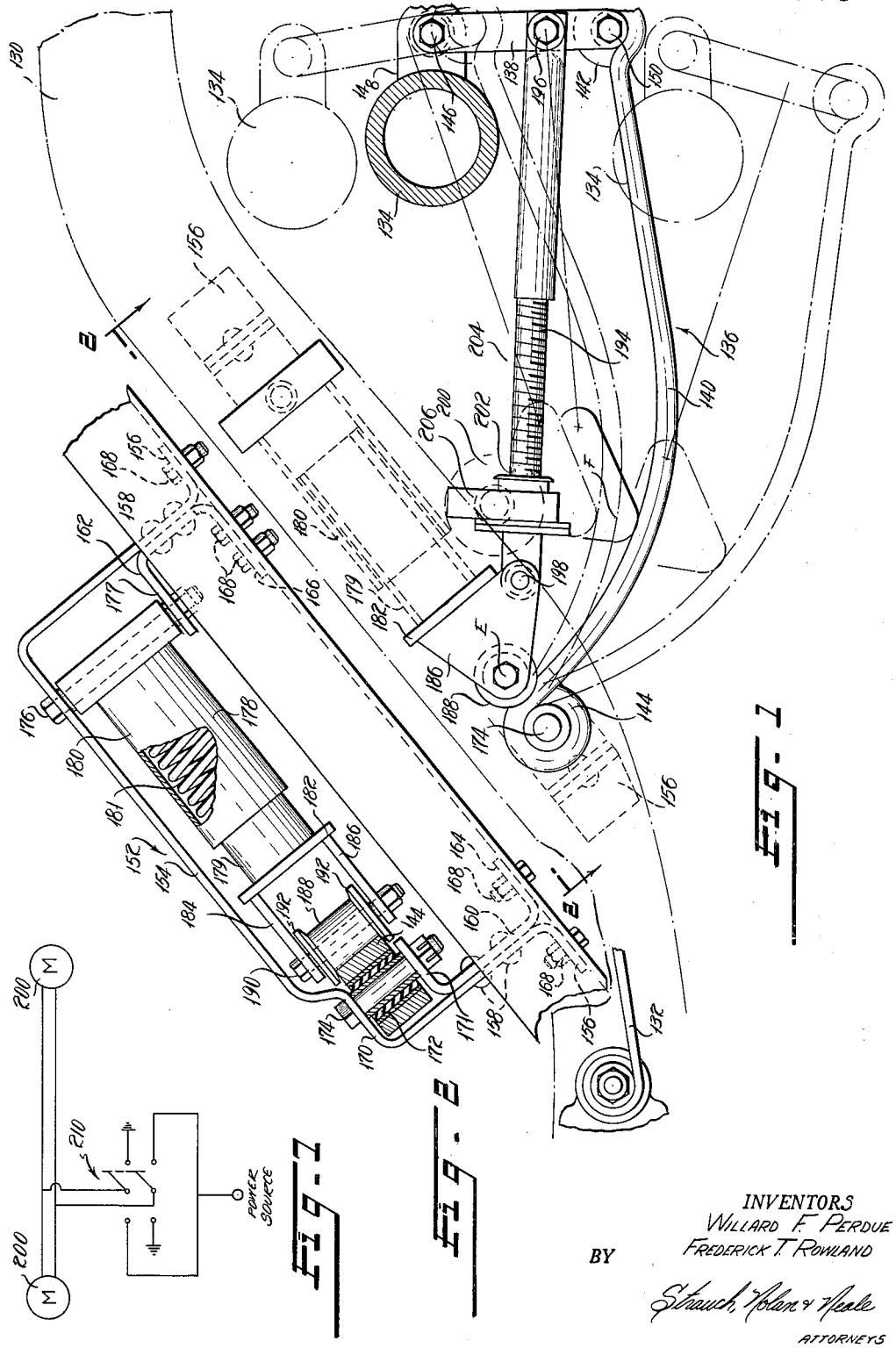

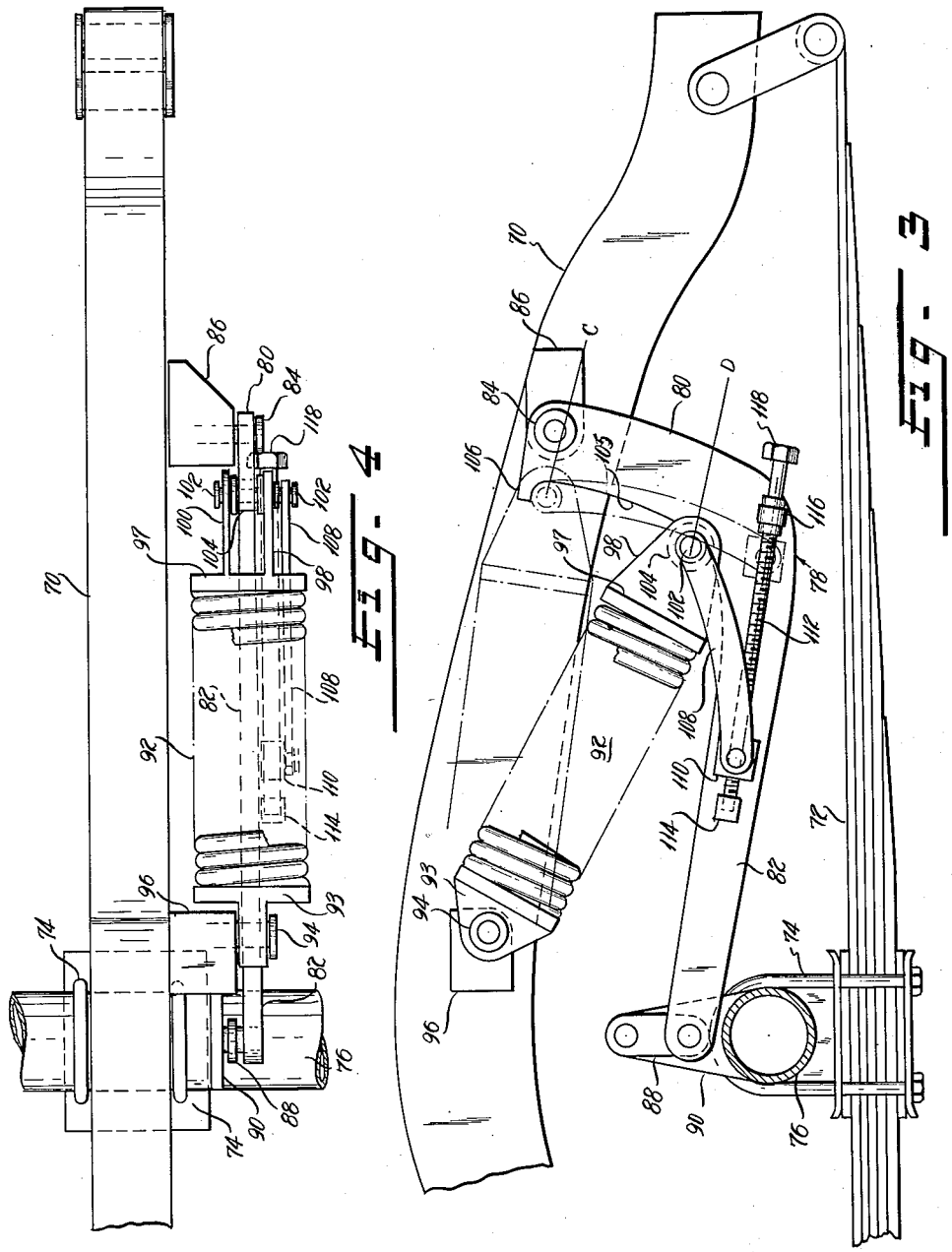

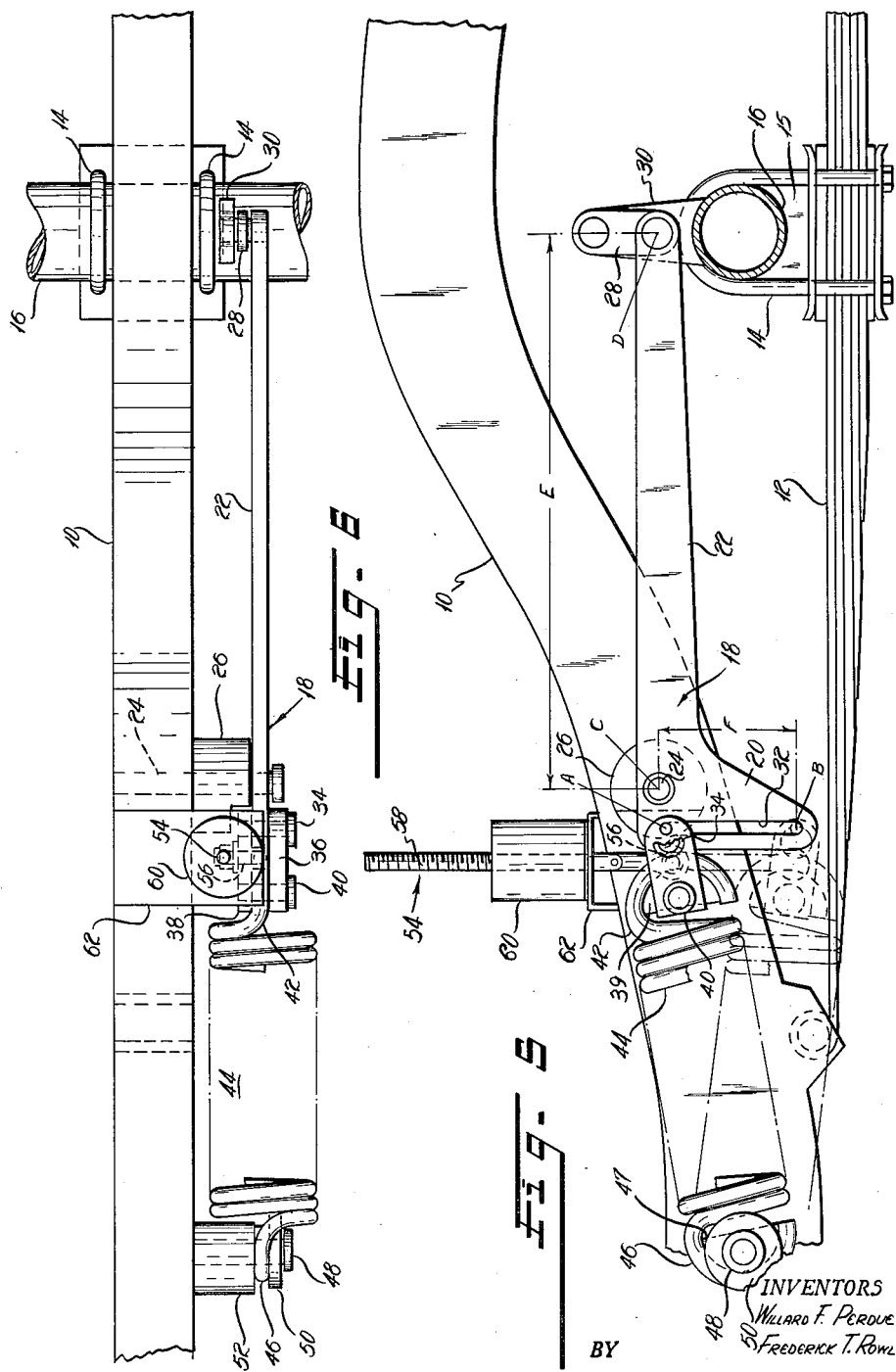

1

2,990,170
AUXILIARY SPRING SUSPENSION
AND LEVELIZER
Willard F. Perdue, New Castle, and Frederick T. Rowland, New Wilmington, Pa., assignors to Rockwell-Standard Corporation, a corporation of Pennsylvania
Filed Nov. 21, 1957, Ser. No. 697,929
12 Claims. (Cl. 267—16)

This invention relates to an auxiliary suspension and levelizing mechanism for a vehicle and is particularly related to the incorporation of such auxiliary mechanism on vehicles.

As is well known, conventional leaf spring suspensions have a theoretically constant flexibility; that is, their deflection is proportional to the load to which they are subjected. For instance, the body and frame of a vehicle sink with reference to the axle an amount proportional to their weight and amount of load added to the vehicle. The amount of sinking is small when the vehicle is empty and gradually increases as load is applied until maximum pay load is reached.

The rate of flexibility for leaf springs can be calculated with reasonable accuracy, therefore, springs are designed for a specific maximum pay load so the suspension will be satisfactory under service conditions. Thus, for vehicles having spring suspensions designed for heavy loads, the amount of sinking of the body and frame is relatively small when the vehicle is empty or has a light load, and results in a hard, stiff, and uncomfortable ride. It, of course, follows that spring suspensions designed to give a comfortable ride at light loads will be unsatisfactory under a heavy load for which it is not designed. It is desirable to provide a spring suspension system that will give satisfactory vehicle riding characteristics regardless of the load conditions.

A further disadvantage inherent in conventional leaf spring suspension systems is that the load is seldom uniformly distributed throughout the vehicle, and as a consequence the frame sinks lower over one wheel than another, resulting in an uneven ride.

Various devices, such as systems comprising a plurality of springs which become operative in succession, systems of coil springs or pneumatic or mechanical levelizers etc., have been proposed to overcome the above unfavorable conditions. U.S. Patents No. 2,607,610, 2,650,108 and 2,687,311 are illustrative of a few such systems.

In view of the foregoing factors, a primary object of this invention resides in the provision of a simplified novel suspension and levelizing mechanism auxiliary to a vehicle main spring suspension which has substantially constant flexibility, the auxiliary mechanism having a variable flexibility compensating for varying loads to insure uniformly comfortable riding conditions regardless of load.

Another object of this invention resides in the provision for vehicles of an improved suspension and levelizing mechanism having link mechanism connected between the vehicle frame and axle and including a spring acting on the link mechanism, the position of application of the force of said spring being movably adjustable along a lever arm of the link mechanism to provide a desired rate of spring suspension flexibility in relation to the load on the vehicle.

A further object of this invention resides in the provision for vehicles having a main spring suspension of constant flexibility, a novel auxiliary suspension and levelizing mechanism which does not increase the rate of flexibility of the main spring but restores the desired relation between vehicle frame and axle and the main spring for increases in load on the vehicle.

A still further object resides in providing a novel auxiliary spring suspension to be used in combination with

2 conventional vehicle main spring suspension and made with a practical and relatively cheap construction.

Further novel features and other objects of this invention will become apparent from the following detailed description, discussion and the appended claims taken in conjunction with the accompanying drawings showing preferred structures and embodiments, in which:

FIGURE 1 is a side elevation view of a preferred embodiment of the suspension and levelizing mechanism in accord with this invention; the levelizer being installed ahead of the rear axle and illustrated in zero position;

FIGURE 2 is a detail view of the levelizer spring assembly taken on the line 2—2 of FIGURE 1;

FIGURE 3 is a side elevation view of a second embodiment of the suspension and levelizing mechanism in accord with this invention, in this instance the levelizer is located to the rear of the rear axle and is illustrated in its maximum pay load position;

FIGURE 4 is a top plan view of the embodiment shown in FIGURE 3;

FIGURE 5 is a side elevation view of a third embodiment of a spring suspension and levelizing mechanism in accord with this invention installed between a vehicle frame and the rear axle, the levelizer being located in front of the rear axle and being illustrated in a zero or inactive position;

FIGURE 6 is a top plan view of the embodiment shown in FIGURE 5; and

FIGURE 7 is a simplified electrical reversing control circuit which can be utilized with the auxiliary suspension and levelizer mechanisms of this invention.

With specific reference to FIGURES 1 and 2, a preferred embodiment of this invention is incorporated in a vehicle having a frame side beam 130 suspended on a leaf spring assembly 132. Although the leaf spring connecting details are omitted in these figures, the assembly 132 is secured between the vehicle frame and the rear axle 134 in the same manner as illustrated in FIGURES 3-6. The auxiliary equalizer assembly is mounted between the inner side of frame side beam 130 and the rear axle 134, in front of the rear axle. The link mechanism connecting the frame beam 130 and axle 134 is indicated generally at 136 and includes a shackle assembly 138 and a long lever 140 which is a spring steel leaf or the like. Lever 140 is preferably curved or arced in a concave direction away from frame 130 as shown, and its opposite ends are turned to provide mounting eyes 142 and 144. One end of the shackle assembly 138 is pivotally connected by a bolt 146 to depend from a mounting bracket 148 rigidly secured to the rear side of rear axle 134. The opposite end of shackle assembly 138 is pivotally connected to one end of lever 140 by a bolt 150 extending through the leaf lever eye 142. An equalizer bracket assembly 152, fixed to frame beam 130, pivotally secures the mounting eye 144 of the lever 140 to frame beam 130.

Bracket assembly 152 (best shown in FIGURE 2) is fabricated from a substantially U-shaped major bracket 154 bent outwardly at the legs thereof to form flanges 156. Rigidly secured to the inside of each leg of bracket 154, as by rivets 158, are supplemental U-shaped brackets 160 and 162. Brackets 160 and 162 are secured with respective flanges 164 and 166 extending opposite but coextensive with the mounting flanges 156, providing double flanges on each mounting leg enabling bracket assembly 152 to be rigidly fastened by bolts 168 to the inside of the frame beam 130 opposite leaf spring assembly 132. The cross piece of large bracket 154 is indented at 170 opposite supplemental bracket 160 and eye 144 of lever 140 fits between a leg 171 of the U-shaped bracket 160 and indented portion 170 of major bracket 154, being pivotally mounted on a rubber bushing 172 carried on a bolt 174 extending between bracket 160 and indented portion 170.

At the end of the crosspiece of large bracket 154 opposite the indented portion 170 is a bolt 176, extending between the crosspiece and leg 177 of U-shaped bracket 162. Bolt 176 pivotally supports one end of a compression spring mechanism 178 which comprises a telescoping tubular compression coil spring retaining housing 179 and 180 in which there is confined a preloaded coil compression spring 181. The other end of spring mechanism 178 is provided with a spring abutment plate 182 which has a fork connector consisting of rigid, spaced triangularly shaped bracket lugs 184 and 186 which rotatably support therebetween a spool shaped roller 188 and a bolt 190. The roller 188 rides on the upper surface of curved lever 140, and is guided by spool flanges 192 which are spaced apart an amount slightly greater than the width of lever 140.

The position at which compression spring mechanism 178 acts on lever 140 through roller 188 is controlled by a variable length telescoping link 194 pivotally connected at one end by a bolt 196 to shackle assembly 138 and pivotally connected at its opposite end between adjacent corners of the triangularly shaped spring connector bracket lugs 184 and 186 by a bolt 198. The length of adjustable telescoping link 194 is varied by an electric motor 200 which can be controlled by the operator of the vehicle.

Adjustable link 194 includes a screw 202 telescoped in threaded engagement into the internally threaded tube end section 204 of link 194. Electric motor 200 is reversible, directly connects, through a gear reduction 206, to the screw 202, is secured to the casing of gear reduction 206 and is shifted, upon adjustment of link 194, along with end member 182 of coil spring assembly 178. Operation of motor 200 in one direction will shorten link 194 to swing the lower end of spring mechanism 178 toward the axle 134. This movement shifts the end member 182 of spring mechanism 178 from the inactive position E shown by solid lines in FIGURE 1 to a new position F where the preloaded coil compression spring force is applied through roller 188 on lever 140 at a position offset from the lever fulcrum bolt 174. The offset position produces a short lever arm creating a moment on lever 140 tending to force the vehicle frame 130 away from the axle 134. The greater the movement of roller 188 away from its inactive position E, the greater will be the resultant moment on lever 140. The minimum and maximum deflections of the levelizer system in respect to the frame 130 with the coil spring at maximum load supporting position are indicated by point "F" shown in FIGURE 5 in broken lines. Operation of motor 200 in the opposite direction moves spring mechanism toward the inactive position. Hence it will be understood that an increase in vehicle load can be absorbed by the auxiliary lever 140 and spring mechanism 178 without a resultant deflection of the main suspension leaf spring assembly 132, and subsequent changes in load can be attended to by adjustments of the link 194 in an appropriate direction. This embodiment provides additional spring action through the leaf spring construction of the spring steel lever 140.

FIGURES 3 and 4 illustrate a second embodiment of the invention, a side beam 70 of a vehicle frame being conventionally suspended on leaf spring assembly 72 which is secured in a conventional manner by U-shaped clamps 74 to a rear axle 76. In this instance, the auxiliary levelizer device between the frame beam 70 and axle 76 is a link mechanism comprising an L-shaped lever 78 behind the axle 76. Lever 78 has a short arm 80 and a long arm 82, and is pivotally mounted adjacent the end of its short arm 80 on a bolt or pin 84 extending through a boss 86 rigid on the side of frame beam 70 rearwardly of axle 76. Long lever arm 82 of lever 78 has its end pivotally connected, through a shackle 88, to a mounting bracket 90 rigidly secured as by welding to the upper portion of axle 76.

The lever 78 functions in structural cooperation with a preloaded coiled compression spring 92 which has an end fitting 93 pivotally anchored to a pin 94 extending through a second boss 96 rigid on the side of frame beam 70. An opposite end fitting 97 of preloaded coil spring 92 is forked and its two parallel arms 98 and 100 support a transverse pin 102 which journals a spool shaped roller 104 between the arms. Roller 104 is disposed to roll along the inside edge 105 of the short lever arm 80, which constitutes a roller track. Edge 105 terminates adjacent the pivoted end of short lever arm 80 in a projection 106 which serves as one limit stop determining the uppermost position of the roller 104. The intersection of long lever arm 82 with the short lever arm 80 serves as the limit stop for downward movement of roller 104.

Shifting movement of the preloaded coil spring end 97 along the inside edge of short lever arm 80 between points C and D (FIGURE 3) is accomplished by an adjusting mechanism mounted on the lever 78. A connecting rod link 108 has one end pivotally connected to the spring roller pin 102 and its opposite end pivotally connected to a movable slider nut 110 threaded on a screw shaft 112 rotatably mounted and axially maintained in bearings 114 and 116 fixed to lever 78 on the side of long arm 82. The screw shaft 112 can be manually rotated by a wrench or suitable tool (not shown) cooperating with the head end 118. Screw rotation relative to slider nut block 110 which is maintained non-rotatably as by flat engagement with the side surface of lever arm 82, moves the slider nut axially along screw 112, shifting the connecting link 108, to reposition the roller end 97 of preloaded coil spring 92 on the edge track 105 of short lever arm 80.

The above described linkage for changing the position at which the shiftable end 97 of the preloaded coil compression spring 92 bears against short lever arm 80 is considered illustrative, it being understood that various suitable means may be provided for this purpose. For example, a hydraulic or pneumatic piston which reciprocally actuates a rod connected to the pin 102, or a power unit similar to that shown in FIGURES 1 and 2 connected to rotate power screw 112, could be used to shift the spring end 97.

Load equalizing operation of the embodiment illustrated in FIGURES 3 and 4, depends upon the compression spring 92 exerting a corrective force between frame beam 70 and axle 76 through lever 78. When the adjusting mechanism is in normal position C, as shown in FIGURE 4, the line of force of preloaded spring 92 is aligned between the centers of pivots 84 and 94 fixed to the frame beam 70 and the preloaded spring 92 can exert no corrective force. When additional load is placed on the vehicle, the frame, represented by beam 70, sinks relative to axle 76 and the auxiliary suspension and levelizer lever 78 will pivot clockwise about its fulcrum pin 84. By rotating screw shaft 112, the slider nut block 110 is moved axially along the screw 112 to shift the position at which preloaded coil compression spring 92 acts on short arm 80 causing a moment, created by the force of preloaded coil spring 92 on short arm 80, about fulcrum pin 84. As the equalizing spring end 97 shifts further along short arm 80 toward point D, the moment increases and lever 78 will pivot counterclockwise about its fulcrum pin 84 to return the vehicle frame (beam 70) to its normal vehicle level position relative to axle 76. As can be seen from the foregoing, the leaf spring assembly 72 does not undergo a spring rate change because of additional load due to the auxiliary coil spring maintaining the frame 70 in a normal position in relation to axle 76, and permitting the primary leaf spring assembly 72 to coact at a low load spring rate.

FIGURES 5 and 6 illustrate a third embodiment of the invention in which channel beam 10 of a vehicle frame is suspended on a leaf spring assembly 12 which is secured in a conventional manner by U-shaped clamps 14 and block 15 to the vehicle rear axle 16.

Mounted between the vehicle frame beam 10 and rear axle 16 is a load equalizing link mechanism comprising an L-shaped or dog-leg lever 18 having a short arm 20 and a long arm 22. Lever 18 is pivotally mounted, in the manner of a bell crank, at the intersection of short arm 20 and long arm 22 on a pin 24 fastened through a boss 26 rigid on the side of frame beam 10 forward of the rear axle 16. The long arm 22 of lever 18 extends rearwardly and is pivotally connected through a shackle 28 to a mounting bracket 30 secured as by welding to the upper portion of axle 16. Extending approximately the length of short lever arm 20 is a slot 32 providing a guide track for a pin 34 secured between adjacent ends of a pair of parallel links 36 and 38. The opposite ends of links 36 and 38 are spaced apart by a spring anchor block 39 which is secured between the two links by a second pin 40. Pins 34 and 40 can be retained by suitable clips or cotter keys or, in the form of both, can be secured by nuts. An end loop 42 of a preloaded coiled tension spring 44 is connected over the anchor block 39. The opposite end loop 46 of the preloaded spring 44 is anchored to a block 47 secured by a pin 48 and a washer 50 to a second boss 52 rigid with the frame beam 10.

Pin 34 which fastens one end of preloaded spring 44 to the lever 18 can be positioned along lever slot 32 by an adjusting mechanism which includes an articulated rod 54 having its lower end pivotally connected to spring anchor link 38 by a bolt or pin 56. The upper portion 58 of articulated rod 54 has external screw threads and is operatively threaded in and through an internally threaded hollow drive shaft (not shown) of an electric motor 60 fastened on a bracket 62 which is secured as by welding to the vehicle frame 10. Operation of motor 60, will reciprocate the threaded portion 58, of rod 54 and shift the spring anchor pin 34 to a position between the limit positions denoted as points A and B on the short lever arm 20. Phantom lines in FIGURE 5 illustrate pin 34 in position B. The electric motor system described is intended to be illustrative of any number of means for shifting the point of connection of spring 34 along the length of short lever arm 20 and a hydraulic cylinder having a piston connected to rod 54 will provide equally good results. Furthermore, in lieu of articulating the rod 54, the motor 60 could be mounted on the frame for pivotal movement to permit arcuate shifting movement of the links 36 and 38, as lever 18 shifts under load fluctuations.

Although the coil tension spring 44 is pre-tensioned, it will be essentially inoperative to exert a turning force on lever 18 when anchor pin 34 is in position A, shown in full lines in FIGURE 5, as that limit position is essentially on a dead center between the lever fulcrum 24 and the spring fixed anchor pin 48. During adjustment the pin 34 is shifted from position A to some other position and when fully shifted to position B the spring 44 will exert a maximum moment on lever 18 about fulcrum pin 24.

Assuming that an additional load is added to the vehicle, the vehicle frame with side beam 10 will sink (move in a direction toward the axle 16) as permitted by primary leaf spring assembly 12, thus causing bell crank lever 18 to rotate in a counterclockwise direction. To apply an auxiliary force tending to return the vehicle frame to its normal position relative to axle 16, the shiftable spring anchor pin 34 is moved along short lever arm 20 a predetermined distance which with the force exerted by tension spring 44 is proportional to the additional vehicle load. When the spring anchor pin 34 is adjusted to the position between points A and B where the moment on lever 18 resulting from the spring force is sufficient to counteract the additional load, the bell crank lever 18 will have been rotated or pivoted in a clockwise direction to a position where lever arm 22 is restored to an essentially horizontal position and the vehicle frame 10 is again in its normal position relative to axle 16. The additional load on the vehicle is thus absorbed by the coil tension spring 44 which is auxiliary to leaf spring 12, thereby enabling the leaf spring 12 to absorb a normal design loading in the most efficient manner and for which the spring rate of the leaf spring assembly is designed.

Although the specific structures of each embodiment include variations, all utilize the basic principle of applying a spring force to an auxiliary suspension lever to create a moment through the lever to counteract loading on a vehicle frame. Adjustability in all embodiments is obtained by varying the length of the arm through which the spring force is applied to the auxiliary lever.

Whenever a controlled motor is used to obtain adjustment of any of these auxiliary suspensions, it is preferable to provide an independent control circuit for the motor in each load equalizer for each spring assembly to adjust for unbalanced load conditions. For a reversible electric motor, such as motor 200 in FIGURES 1 and 2, this can be accomplished by using a double pole, double throw switch 210, spring biased to neutral, connected to each single motor control circuit in a manner similar to that included in the dual control circuit in FIGURE 7. A dual control on lateral sets of motor adjusted levelizers may be desirable to simultaneously change the adjustment of both levelizers in the lateral set and a simplified reversing circuit for two motors 200 connected in parallel and controlled by one switch 210 as illustrated in FIGURE 7. The specific manner and details of the control of motors 200 can include extensive refinements such as electric position indicators, automatic synchronization of equalizer adjustment and automatic switch control of the circuits at equalizer limit positions, however such control details are not considered material to this invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An auxiliary adjustable spring suspension for a wheel of a vehicle operatively connected between the wheel axle and vehicle frame comprising a link mechanism having a long lever and a short connecting link; means pivotally connecting said lever and link together; means pivotally connecting said lever to said frame; means pivotally connecting said short link to said axle; a compression spring mechanism pivotally mounted at one end of said frame; means mounting a roller on the opposite end of said spring mechanism, said roller engaging said lever and being movable therealong; and means for adjustably moving the position at which said roller engages said lever.

2. An auxiliary adjustable spring suspension for a wheel of a vehicle operatively connected between the wheel axle and the vehicle frame comprising: a link mechanism having a long link and a short link pivotally connected together; means pivotally connecting said long link to said frame and means pivotally connecting said short link to said axle; a spring mechanism having one portion pivotally connected to said frame and an opposite portion acting on a point on said long link; means operatively connected to said opposite portion of said spring mechanism for adjustably moving the position at which said opposite portion of said spring mechanism acts on said long link, comprising a variable length link means pivotally connecting one end of said variable length link to said spring mechanism and means pivotally connecting the opposite end of said variable length link to said link mechanism; and means for varying the length of said variable length link.

3. An auxiliary adjustable spring suspension for a wheel of a vehicle operatively connected between the wheel axle and the vehicle frame comprising: a link mechanism having a long link and a short link pivotally connected together; means pivotally connecting said long link to said frame and means pivotally connecting said short link to said axle; a spring mechanism having one portion pivotally connected to said frame and an opposite portion acting on a point on said long link; means operatively connected to said opposite portion of said spring mechanism for adjustably moving the position at which said opposite portion of said spring mechanism acts on said long link; and said spring mechanism includes means mounting a roller on said opposite portion, said roller engaging and being biased against said long link and being rotatable therealong.

4. An adjustable spring suspension for a wheel of a vehicle operatively connected between the wheel axle and vehicle frame, the combination comprising: a lever having two pivotal connections; means pivotally connecting one of said pivotal connections to said frame and the other of said pivotal connections to said axle; a spring means having a first end acting upon said frame and a second end acting on a point along said lever to create a biasing force on said lever; means for adjustably moving the position at which said second end of said spring means acts upon said lever comprising a link having one end pivotally connected to said second end of said spring means; and adjustable means connecting between the opposite end of said link and said axle to move said link and shift said second end of said spring.

5. An adjustable spring suspension for a wheel of a vehicle operatively connected between the wheel axle and vehicle frame, the combination comprising: a lever having two pivotal connections; means pivotally connecting one of said pivotal connections to said frame and the other of said pivotal connections to said axle; a coiled compression spring means having a first end acting upon said frame and a second end acting on a point along said lever to create a biasing force on said lever; means for adjustably moving the position at which said second end of said spring means acts upon said lever comprising a link having one end pivotally connected to said second end of said spring means: and adjustable means connecting between the opposite end of said link and said axle to move said link and shift said second end of said spring.

6. An adjustable spring suspension for a wheel of a vehicle operatively connected between the wheel axle and vehicle frame, the combination comprising: a lever having two pivotal connections; means pivotally connecting one of said pivotal connections to said frame and the other of said pivotal connections to said axle; a spring means having a first end acting upon said frame and a second end acting on a point along said lever to create a biasing force on said lever; means for adjustably shifting the position at which said second end of said spring means acts upon said lever, comprising an adjustable length link pivotally connected between said second end of said spring means and a position adjacent the other pivotal connection of said lever.

7. The combination defined in claim 6, wherein a controllable motor means is mounted on, and is drive connected to selectively vary the length of, said adjustable length link.

8. The combination defined in claim 6, wherein said second end of said spring means includes a roller adapted to engage and move along said lever as said spring means is shifted, said roller and lever including cooperative means for guiding said roller along said lever in its shifting movement.

9. The combination defined in claim 6 wherein a common bridging bracket means mounts said lever and said first end of said spring means and comprises the means pivotally connecting one of said connections to said frame.

10. An auxiliary adjustable spring suspension for a wheel of a vehicle operatively connected between the wheel axle and the vehicle frame comprising: a link mechanism having a long link and a short link pivotally connected together; means pivotally connecting said long link to said frame and means pivotally connecting said short link to said axle; a pre-loaded spring mechanism having one portion pivotally connected to said frame and an opposite portion adapted to selectively act at a plurality of positions on said long link including a position where the pre-load spring force is applied essentially dead-center relative to the pivot axis of the link connection to said frame; means operatively connected to said opposite portion of said spring mechanism for adjustably moving the position at which said opposite portion of said spring mechanism acts on said long link, comprising a variable length link, means pivotally connecting one end of said variable length link to said spring mechanism and means pivotally connecting the opposite end of said variable length link to said link mechanism; and means for varying the length of said variable length link.

11. An auxiliary adjustable spring suspension for a wheel of a vehicle operatively connected between the wheel axle and the vehicle frame comprising: a link mechanism having a long link and a short link pivotally connected together; means pivotally connecting said long link to said frame and means pivotally connecting said short link to said axle– a pre-loaded spring mechanism having one portion pivotally connected to said frame and an opposite portion adapted to selectively act at a plurality of positions on said long link including a position where the pre-load spring force is applied essentially dead-center relative to the pivot axis of the link connection to said frame, and including means mounting a roller on said opposite portion, said roller engaging and being biased against said long link and being rotatable therealong; and means operatively connected to said opposite portion of said spring mechanism for adjustably moving the position at which said roller portion of said spring mechanism engages said long link.

12. An adjustable wheel suspension for a wheel of a vehicle operatively connected between the wheel axle and the vehicle frame comprising a lever having two pivotal connections, means connecting one of said pivotal connections to the frame and the other of said pivotal connections to said axle, spring means with pre-loaded spring force and having a first end acting on said frame and a second end acting on a point along said lever to create a biasing force on said lever, means mounting said spring means between said frame and said lever adapting the line of application of spring force by said spring means to be shifted for application at a plurality of positions on said lever including a dead center alignment of said spring force through the axis of the pivotal connection of said lever to said frame, and means for adjustably moving the position at which said second end of said spring means acts on said lever comprising a link having one end pivotally connected to said second end of said spring means and adjustable means connecting the opposite end of said link and said axle to move said link and shift said second end of said spring means.

References Cited in the file of this patent

UNITED STATES PATENTS

| 1,269,800 | Edwards | June 18, 1918 |
|---|---|---|
| 1,971,541 | Taber | Aug. 28, 1934 |
| 2,733,058 | Reese | Jan. 31, 1956 |
| 2,873,124 | Walker | Feb. 10, 1959 |

FOREIGN PATENTS

| 748,477 | France | Apr. 18, 1933 |